United States Patent
Forest

(10) Patent No.: US 9,280,653 B2
(45) Date of Patent: Mar. 8, 2016

(54) SECURITY ACCESS METHOD FOR AUTOMOTIVE ELECTRONIC CONTROL UNITS

(71) Applicant: GM GLOBAL TECHNOLOGY OPERATIONS LLC, Detroit, MI (US)

(72) Inventor: Thomas M. Forest, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 249 days.

(21) Appl. No.: 13/627,897

(22) Filed: Sep. 26, 2012

(65) Prior Publication Data

US 2013/0111582 A1    May 2, 2013

Related U.S. Application Data

(60) Provisional application No. 61/552,984, filed on Oct. 28, 2011.

(51) Int. Cl.

| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06F 21/44* | (2013.01) |

(52) U.S. Cl.
CPC ........ *G06F 21/44* (2013.01); *G06F 2221/2103* (2013.01)

(58) Field of Classification Search
CPC .......................... G06F 2221/2103; G06F 21/44
USPC .......................................................... 726/19
See application file for complete search history.

(56) References Cited

U.S. PATENT DOCUMENTS

| | | | | |
|---|---|---|---|---|
| 6,292,718 | B2 * | 9/2001 | Staiger ............................. | 701/1 |
| 7,034,654 | B2 * | 4/2006 | Forest et al. ................. | 340/5.26 |
| 7,764,787 | B2 * | 7/2010 | Craft ............................... | 380/28 |
| 8,484,707 | B1 * | 7/2013 | Bertz et al. ......................... | 726/6 |
| 8,528,108 | B2 * | 9/2013 | Ammer et al. .................. | 726/30 |

(Continued)

OTHER PUBLICATIONS

Karl Koscher;Experimental Security Analysis of a Modern Automobile; Year: 2010; IEEE, University of Washington; pp. 1-16.*

(Continued)

*Primary Examiner* — Monjour Rahim
(74) *Attorney, Agent, or Firm* — John A. Miller; Miller IP Group, PLC

(57) ABSTRACT

A system and method for employing a mechanism for unlocking a vehicle ECU. The ECU stores a unique ECU identification value that identifies the particular ECU and a secure server stores the ECU identification value and a unique ECU security key value, where the identification value identifies the security key value in the server, and where the secure server stores the unique ECU identification value and the unique security key value for many ECUs. A service tool that wants to gain access to the ECU for software reprogramming or service requests the ECU identification value and a challenge from the ECU and sends them to the secure server, which then identifies the security key value associated with that ECU identification value and the response for the challenge. The secure server then sends the response to the service tool, which provides it to the ECU to unlock it for programming.

20 Claims, 2 Drawing Sheets

(56) References Cited

U.S. PATENT DOCUMENTS

| | | | |
|---|---|---|---|
| 2001/0032310 A1* | 10/2001 | Corella | 713/156 |
| 2003/0236991 A1* | 12/2003 | Letsinger | 713/200 |
| 2006/0130033 A1* | 6/2006 | Stoffels et al. | 717/166 |
| 2007/0093924 A1* | 4/2007 | Engel et al. | 700/104 |
| 2008/0278282 A1 | 11/2008 | Waldmann | |
| 2009/0177352 A1 | 7/2009 | Grau | |
| 2011/0138188 A1* | 6/2011 | Lee et al. | 713/187 |
| 2012/0095642 A1* | 4/2012 | Nishida | 701/31.4 |

OTHER PUBLICATIONS

Muhammad Sabir Idrees; Secure Automotive On-Board Protocols: Date: Mar. 23-24, 2011; Springer; A Case of Over-the-Air Firmware Updates; pp. 1-14.*

* cited by examiner

SECURITY ACCESS METHOD FOR AUTOMOTIVE ELECTRONIC CONTROL UNITS

CROSS-REFERENCE TO RELATED APPLICATIONS

This application claims the benefit of the priority date of U.S. Provisional Patent Application Ser. No. 61/552,984, titled, Security Access Method for Automotive Electronic Control Units, filed Oct. 28, 2011.

BACKGROUND OF THE INVENTION

1. Field of the Invention

This invention relates generally to a system and method for securely accessing or unlocking an electronic control unit (ECU) on a vehicle and, more particularly, to a system and method for securely accessing or unlocking an ECU on a vehicle, where the system includes a remote secure server that receives an ECU identification value and a security challenge from the ECU and where the server uses the ECU identification value to identify an ECU security key value for the ECU to provide a response to the challenge.

2. Discussion of the Related Art

Many modern vehicles include electronic control units (ECUs), or controllers, which control the operation of vehicle systems, such as the powertrain, climate control system, infotainment system, body systems, chassis systems, and others. Such controllers require special purpose-designed software in order to perform the control functions. With the increasing number and complexity of these controllers, and the growing threat posed by developers of malicious software, it is more important than ever to authenticate the source and content of software files that are installed on automotive controllers. The consequences of using software which is not properly validated, or worse, maliciously-designed, in a vehicle controller include unintended behavior of the vehicle or its systems, loss of anti-theft features on the vehicle, potential tampering with components such as the odometer, and loss of other vehicle features and functions.

The ECUs on a vehicle must sometimes be serviced or updated because of a various reasons, where a service facility would need to gain access to the ECU to either download diagnostic trouble codes or other faults, reprogram the ECU, or perform some other operation to address a vehicle problem. However, it is important for security purposes that only authorized personal be able to access an ECU on a vehicle to perform service operations because an unauthorized user may perform malicious or improper activities that adversely affect the vehicle operation. In other words, it is important that unauthorized users cannot gain access to the vehicle ECU to program the ECU with software that may be malicious or otherwise damaging to the vehicle. Therefore, having secure techniques for unlocking an ECU for programming, service and other operations is necessary.

A vehicle ECU can be unlocked for security sensitive diagnostic operations using some type of challenge/response mechanism, sometimes referred to as a "seed and key," where the seed represents the challenge and the key represents the response. For example, a service tool that is attempting to gain access to an ECU will cause the ECU to issue a challenge message, such as some type of question, that is preprogrammed on the ECU, and the tool must then answer the challenge with the proper response, also preprogrammed on the ECU, that if answered correctly will cause the ECU to allow the tool to gain access to it. Diagnostic standards identify how this process is carried out. For example, ISO 14229 defines a security access service that allows a device to be unlocked using a challenge/response mechanism.

Challenge/response mechanisms of the type referred to above typically fall into two categories. The first category includes fixed challenges, where the challenge, and therefore the expected response, is fixed. In such an implementation, the ECU simply stores the challenge and response, where it is not necessary for the device to have the ability itself to compute the response to a given challenge. One disadvantage of such systems is that once the response is known, it is known for all time, where the same response that unlocks an ECU today would unlock the same ECU tomorrow. Thus, the security provided by this type of challenge/response mechanism is limited.

The second category includes variable responses, where each ECU unlock operation causes a different challenge to be issued by the ECU. This is often implemented by giving the device to be unlocked the capability of computing a response to a given challenge. In many implementations this takes the form of a secret algorithm that allows the computation of a response for a given challenge. This has the benefit of preventing a response from being used at a later point in time, but has the disadvantage that the security of the system lies in the secrecy of the algorithm. If all devices use the same algorithm, exposure of the algorithm, which must be embedded in every ECU, reduces the overall security of the system.

SUMMARY OF THE INVENTION

In accordance with the teachings of the present invention, a system and method are disclosed for unlocking a vehicle ECU to allow files to be installed on the ECU. The ECU stores a unique ECU identification value that identifies the particular ECU and a secure server stores the ECU identification value and a unique ECU security key value, where the identification value identifies the security key value in the server, and where the secure server stores the unique ECU identification value and the unique security key value for many ECUs. A service tool that wants to gain access to the ECU for software reprogramming or service requests the ECU identification value and a challenge from the ECU and sends them to the secure server, which then identifies the security key value associated with that ECU identification value and the response for the challenge. The secure server then sends the response to the service tool, which provides it to the ECU to unlock it for programming. The next time the ECU is serviced, it provides a different challenge that the secure server will be able to correctly respond to because it knows the ECU security key value.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for unlocking or accessing a secure vehicle ECU is merely exemplary in nature, and is in no way intended to limit the invention or its applications or uses. For example, the present invention has particular application for accessing a vehicle ECU. However, as will be appreciated by those skilled in the art, the technique of the invention may have application for accessing other controllers.

The present invention proposes a method to allow secure access to a vehicle ECU for installing software. The method is compatible with the security access methods defined in relevant international standards, such as ISO 14229, and provides better security than other alternatives that have been proposed. The general idea of the invention is that an ECU-specific security key is provided, which is known by both the ECU and the manufacturer. This security key is used with a cryptographic authentication algorithm, for example, a message authentication code (MAC), to create a challenge/response system. The ECU to be unlocked provides a unique ID that is used to look up the security key in a defined database, such as provided by the vehicle manufacturer, and the manufacturer is able to use this key to generate a valid response to the challenge provided by the ECU. The cryptographic algorithm inside the ECU can be disclosed without decreasing the security of the system, as the security lies with the security key, which is different for each ECU.

A service facility attempting to unlock an ECU needs to communicate with a security server at a remote site. This communication can be obtained by direct connection to the internet, or by various other communications mechanisms, such as short messages, web page access, SMS text messages, a telephone voice response system, etc. This communication is facilitated by the relatively small amount of information that needs to be exchanged between the ECU and the security server. A proposed refinement makes it simpler to implement the database functionality by having the ECU-specific security key be derived from the ECU's unique identification information by a second cryptographic algorithm that directly relates the security key to the ID, i.e., the key is a cryptographic function of the ID, eliminating the need to create a security key database.

Figure 1:
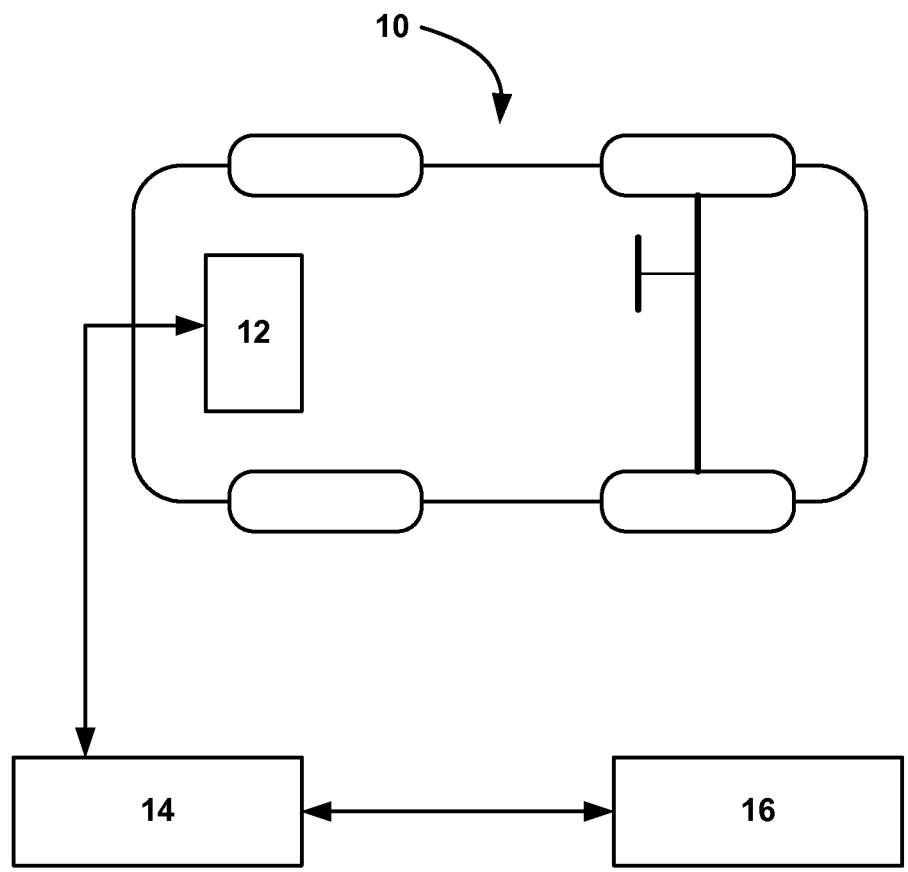
FIG. 1 is an illustration of a vehicle including a vehicle ECU.

FIG. 1 is an illustration of a vehicle 10 that includes an ECU 12 intended to represent one or more ECUs on the vehicle 10 without limitation to the type of vehicle, the type of ECU 12, the purpose of the ECU 12, etc. As will be discussed below, the present invention describes a technique to unlock the ECU 12 so that it can be programmed or serviced for the installation of software files by a service facility using a service tool 14. According to the invention, each ECU on the same vehicle or each ECU on different vehicles will have its own ECU identification value and security code or key. As will be discussed in detail below, the service tool 14 obtains the ECU identification value and a challenge from the ECU 12 and sends them to a remote facility or security server 16 that also stores the identification values and security keys for all of the ECUs in the system. The server 16 receives the ECU identification value and the challenge from the tool 14, identifies the ECU security key from the identification value and identifies the response to the challenge that is stored on the server 16 from the security key. The server 16 sends the response to the tool 14, which provides it to the ECU 12, and if correct allows the tool 14 to gain access to the ECU 12.

The proposed challenge response mechanism for unlocking a vehicle ECU does not suffer from the drawbacks discussed above. Essentially, each different ECU in the vehicle 10 uses a different algorithm. As a result, a successful reverse engineering of one ECU or other device only affects the security of that device, and not other devices in the system. The procedure has, however, been modified to be more consistent with the requirements of security unlocking for diagnostic operations.

As discussed, the use of a challenge/response mechanism for unlocking an ECU requires an entity that is capable of authorizing the operation, i.e., the security server 16. The security server 16 is in possession of all of the information required to authorize all of the ECUs, and as such the security (physical and IT) of the security server 16 is critical to the system. In an ideal implementation, the security server 16 would be located at a secure data center, and access to the server 16 would be via carefully controlled network connections. The existence of "portable" security servers, even if only intended for development or service operations, would put the security of the security server 16, and thus the system as a whole is at risk, and should therefore be avoided.

Each ECU 12 has an ECU-specific identifier value $ID_{ECU}$ that is unique for that ECU 12, i.e., any two different ECUs of the same type of ECU would have different $ID_{ECU}$ values. The memory storing this value does not need to be protected against a diagnostic read, but should be protected against a diagnostic write. There should be a mechanism to allow this information to be retrieved from the ECU 12 when it is in a locked security state, for example, retrievable by an unsecured DID read using, for example, the ISO 14229 ReadDataByIdentifier service. Note that many ECUs already provide traceability information via DIDs, including serial number information. If it is unique for each ECU 12, the traceability information could be used for the $ID_{ECU}$ value.

Each ECU 12 also has an ECU-specific secret key value $K_{ECU}$ that is specific to each ECU 12, i.e., any two different instances of the same type of ECU 12 would have different $K_{ECU}$ values. The memory storing the $K_{ECU}$ value must be protected against diagnostic operations that read or write memory, and there should be no diagnostic service that allows this information to be read or modified.

The entity operating the system maintains a database of the pair of $ID_{ECU}$, $K_{ECU}$ values for every ECU 12 produced. This database must be implemented in a secure manner, as exposure of the database would compromise the security of the system. The database must support query functions that, given the $ID_{ECU}$ value, returns the corresponding ECU-specific value of $K_{ECU}$.

Both the $ID_{ECU}$ and $K_{ECU}$ values are programmed into the ECU 12 prior to completion of vehicle manufacturing, for example, either by the ECU manufacturer or as part of the assembly operation of the vehicle into which the ECU 12 is installed. As a result, each ECU 12 in the field would have a distinct set of $ID_{ECU}$, $K_{ECU}$ values, and the security server 16 must support queries for the $ID_{ECU}$ and $K_{ECU}$ values of all fielded vehicles.

Figure 2:
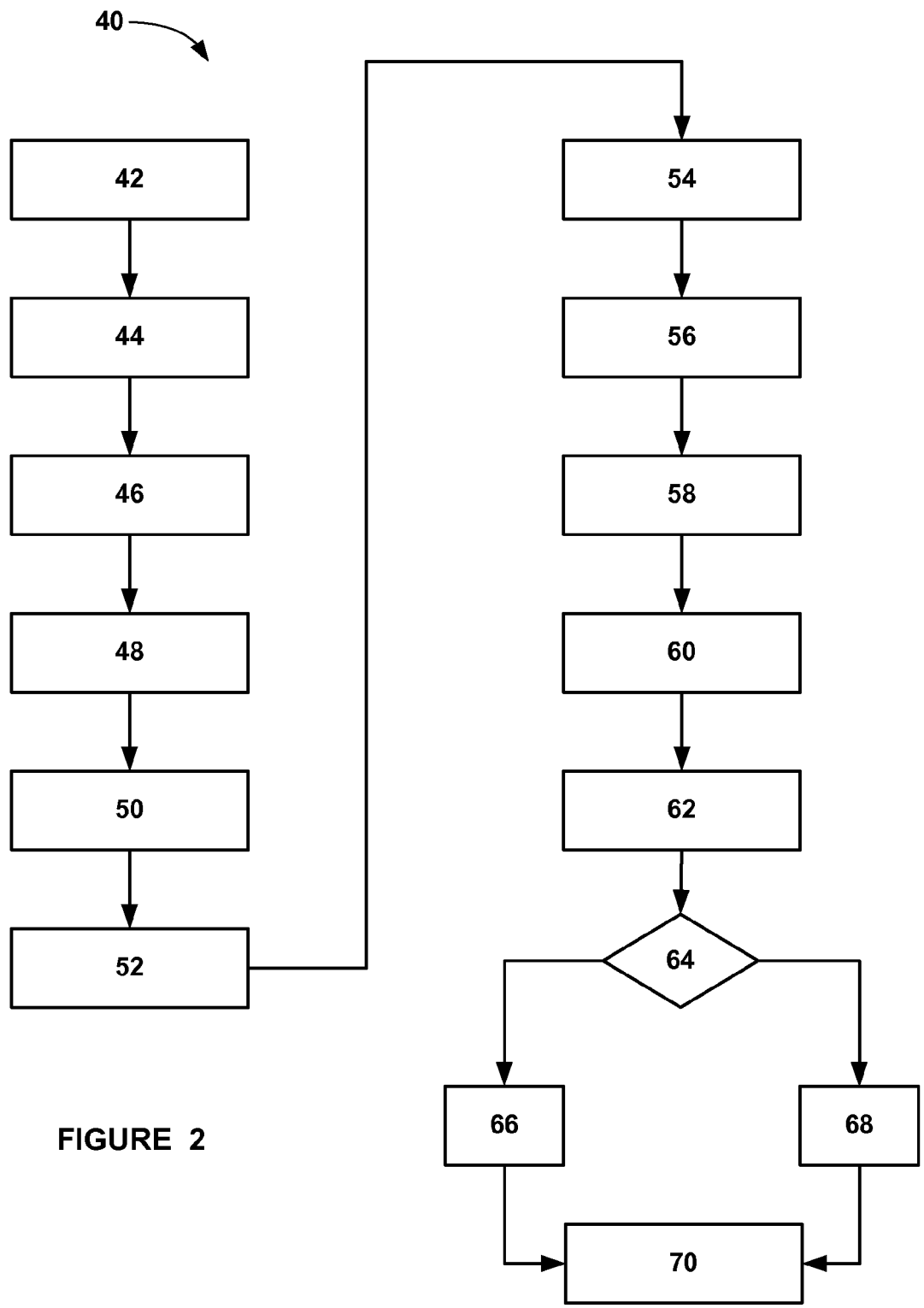
FIG. 2 is a flow chart diagram for unlocking the ECU using a remote secure database.

FIG. 2 is a flow chart diagram 40 showing one process for unlocking the ECU 12 in the manner discussed above. Some steps of the process are performed by the ECU 12, some are performed by the tool 14 used by the service technician, and some are performed by the security server 16 that has access to the $ID_{ECU}$, $K_{ECU}$ pair database.

The tool 14 queries the ECU 12 with, for example, the ISO 14229 ReadDataByIdentifier service to obtain the ECU-specific $ID_{ECU}$ value and the ECU 12 responds to the query by providing its $ID_{ECU}$ value at box 42. The tool 14 then initiates an ISO 14229 SecurityAccess service request by requesting from the ECU 12 the seed for the type of resource that it wishes to unlock, for example, programming or I/O control, at box 44. This can be done by using a RequestSeed or RequestSeed_IO_Control subfunction in the ECU 12.

The ECU 12 computes a random or pseudorandom 32-bit value $C_i$ to serve as the seed in the ISO 14229 SecurityAccess procedure at box 46. It is noted that selecting a 32-bit value as the seed is by way of a non-limiting example in that any suitable seed can be employed. This value must be changed each time the process is initiated, should not be predictable, and must not leak any useful information about the $K_{ECU}$ value if the $K_{ECU}$ value is leveraged to produce unpredictable pseudorandom values. There are numerous known techniques to generate such random values, and this practice is well established in the automotive space due to its use as a challenge in immobilizer systems. U.S. Pat. No. 7,034,654 titled Motor Vehicle Engine Immobilizer Security System and Method, issued Apr. 25, 2006 to Forest et al., assigned to the assignee of the application and herein incorporated by reference, discloses an example of a technique to combine pseudorandom and true random information to develop a value for C. The ECU 12 then responds to the ISO 14229 SecurityAccess RequestSeed request by providing the $C_i$ value as the seed value to the tool 14 in an ISO 14229 SecurityAccess response message at box 48.

The tool 14 then prepares a message containing the $ID_{ECU}$ and $C_i$ values and sends it to the server 16 at box 50. The server 16 then uses its access to the secure database to look up the $K_{ECU}$ value that corresponds to the provided $ID_{ECU}$ value at box 52. Note that the $K_{ECU}$ value never leaves the security server 16. The server 16 then creates a message $MSG_i$ consisting of the $C_i$ value concatenated with the $ID_{ECU}$ value concatenated with additional predefined padding data PAD, if required, at box 54. In other words:

$$MSG_i = C_i | ID_{ECU} | PAD \qquad (1)$$

The server 16 uses a secure message authentication code (MAC), known to those skilled in the art, keyed by the $K_{ECU}$ value, to compute an authenticator $A_i$ at box 56 as:

$$A_i = MAC(MSG_i, K_{ECU}) \qquad (2)$$

The authenticator $A_i$, the size of which is determined by the details of the MAC algorithm, is reduced to 32 bits in length, for example, by keeping only the least significant 32 bits of the authenticator $A_i$. This reduced length value serves as the response, denoted $R_i$, as:

$$R_i = \text{Reduce\_to\_32\_bits}(A_i) \qquad (3)$$

The server 16 then prepares a message containing the response $R_i$ and sends it to the tool 14 at box 58, described below. The tool 14 continues with the ISO 14229 process by sending another SecurityAccess message to the ECU 12 with the subfunction SendKey, using the response $R_i$ as the 32-bit key required by the SecurityAccess process at box 60. The ECU 12 receives the ISO 14229 key value from the tool 14, and performs a similar computation as the computation that was done by the server 16 to compute the $R_i$ value at box 62, as:

$$MSG_i = C_i | ID_{ECU} | PAD \qquad (4)$$

$$A_i = MAC(MSG_i, K_{ECU}) \qquad (5)$$

$$R_i = \text{Reduce\_to\_32\_bits}(A_i) \qquad (6)$$

At decision diamond 64, the ECU 12 compares the key received during the ISO 14229 security access process with the computed $R_i$ value. If the two values match exactly, the ECU 12 performs a security unlock operation at box 66. If the values differ in any way, the ECU 12 will not perform the security unlock at box 68. The ECU 12 also sends an appropriate ISO 14229 response message depending on the results of the comparison at box 70.

The processes at the boxes 50 and 58 require communication between the tool 14 and the server 16, which can be any suitable communication. For example, the most convenient mechanism would be if the tool 14 and the server 16 could both be directly connected to a network, such as by the internet. Several other more indirect communications methods could be used. Since the information sent in the processes at the boxes 50 and 58 is relatively compact, i.e., within a size that can be fairly easily handled by a human with a relatively low likelihood of error, a number of indirect mechanisms could also be used if direct connectivity is not possible. Some examples might include displaying the information on the tool 14 and then allowing a technician to enter the displayed data into a web-based interface to the server 16, where the server 16 would then display the resulting $R_i$ value on a web page and where the technician keys the response into the tool 14. Variations of this process could include using a voice response system, using SMS messages, using an application on a smart phone-like device, using email, etc.

Regardless of the mechanism, it is assumed that the interaction with the server 16 has some type of effective access control mechanism, i.e., limits who is able to obtain the unlocking capability. Since it is likely that a company providing such a service would charge a fee for providing access, it is also likely such mechanisms would already be in place. In addition, it is important that the server 16 keeps secure logs of transactions, i.e., who performs them, when they are performed, the targeted ECU, etc. These logs can be used to detect attempts to compromise the system, and work to identify who or what is affected if a breach does occur.

One of the more difficult aspects of the security server 16 described above is maintaining the database of the $ID_{ECU}$, $K_{ECU}$ pairs and providing fast access to lookups of the $K_{ECU}$ value indexed by the $ID_{ECU}$ value. In the previous description there was no relationship between the $ID_{ECU}$ and $K_{ECU}$ values, i.e., they could each be viewed as random numbers. From an operational perspective, however, it may be possible to avoid the need for a database if there is a secure relationship between the $K_{ECU}$ and $ID_{ECU}$ values that would allow the key to be determined from the ID. This can be done in many ways. One non-limiting example implementation would be to relate the two values by a keyed cryptographic operation that allows someone in possession of the key to determine the $K_{ECU}$ value given the $ID_{ECU}$ value. This could be done using a secure cryptographic MAC function, keyed with a separate secret key $K_{MANUF}$ that would be used to generate the $K_{ECU}$ value for a given $ID_{ECU}$ value in a manner similar to the following.

$$MSG_{ECU} = (ID_{ECU} | PAD) \qquad (7)$$

$$K_{ECU} = MAC(MSG_{ECU}, K_{MANUF}) \qquad (8)$$

Here, PAD represents predefined padding data, if required to meet the input requirements of the MAC function. Also, note that the secret key $K_{MANUF}$ is distinct from each $K_{ECU}$ value in the system, and there is never a requirement to place the secret key $K_{MANUF}$ in any ECU 12 or service tool 14, i.e., the ECU 12 when provisioned, is simply provided with an $ID_{ECU}$, $K_{ECU}$ pair that was generated using the secret key $K_{MANUF}$.

The mechanism described above will compute a distinct $K_{ECU}$ value for each $ID_{ECU}$ value, and the security of the cryptographic MAC makes it difficult for a hacker that does not possess the secret key $K_{MANUF}$ to determine the $K_{ECU}$ value for a given $ID_{ECU}$ value. When such a relationship exists between the $K_{ECU}$ and $ID_{ECU}$ values the database relating the $ID_{ECU}$, $K_{ECU}$ pairs can be replaced by an online computation of the $K_{ECU}$ value using the $ID_{ECU}$ value provided by the security server 16.

It is important to realize that the security of such a system is critically dependent on the secrecy of the secret key $K_{MANUF}$. Ideally, the secret key $K_{MANUF}$ would never leave the security server 16, and the security server 16 would be used to generate the sequence of $ID_{ECU}$, $K_{ECU}$ pairs that would be required to provision the ECU's. If desired, it might be possible to have a provisioning server (not shown) that generates the pairs required to initially provision an ECU to be separate from the security server 16 that recovers the $K_{ECU}$ value given the $ID_{ECU}$ value. This might allow, for example, placement of the provisioning server at a manufacturing site and the placement of the security server 16 in a secure data center.

Note also that it is not necessarily required that all ECUs use the same value of the secret key $K_{MANUF}$ for setting up the relationship of the $ID_{ECU}$, $K_{ECU}$ pairs. Using different values of $K_{MANUF}$ for different ECU types would allow, for example, the creation of provisioning servers that would only be able to provision a single type of the ECU 12. A compromise of the provisioning server would only compromise the ECU's of that type, i.e., would not allow the unlocking of other ECUs that used different values of the secret key $K_{MANUF}$. Clearly, such an implementation would also require some additional information, for example, the ECU type, to allow the security server 16 to determine the correct value of the secret key $K_{MANUF}$ used to recover the $K_{ECU}$ value for the ECU type.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for allowing access to an electronic control unit (ECU) on a vehicle, said method comprising:
   storing an ECU identification value that identifies the ECU in a memory on the ECU;
   storing the ECU identification value and an ECU security key value associated with the ECU identification value at a remote and secure database;
   requesting the ECU identification value from the ECU by a service tool;
   generating a challenge in the ECU in response to the request;
   sending the ECU identification value and the challenge from the ECU to the service tool;
   sending the ECU identification value and the challenge from the service tool to the secure database;
   identifying the ECU security key value that corresponds to the ECU identification value;
   generating a message in the database based on the ECU security key value that includes a response to the challenge;
   sending the message from the database to the service tool;
   sending the message from the service tool to the ECU; and
   allowing access to the ECU if the response to the challenge is accepted by the ECU.

2. The method according to claim 1 wherein generating a message in the database includes using a secure message authentication code that is keyed to the ECU security key value to provide an authenticator.

3. The method according to claim 1 wherein there is no relationship between the ECU identification value and the ECU security key value other than the ECU identification value being used to identify the ECU security key value.

4. The method according to claim 1 wherein the ECU identification value and the ECU security key value are related by a secret key where the ECU security key value is calculated using the ECU identification value and the security key.

5. The method according to claim 4 wherein the ECU security key value is calculated using a secure cryptographic message authentication code.

6. The method according to claim 4 wherein the ECU security key value is calculated at a provisioning server.

7. The method according to claim 1 wherein sending the ECU identification value and the challenge to the secure database and sending the ECU identification value and the challenge from the service tool to the secure database includes using a communications link selected from the group consisting of short messages, internet, web page access, SMS text messages, smart phone, email, voice response system and telephone connections.

8. The method according to claim 1 wherein generating a challenge in the ECU includes computing a random or pseudorandom bit value.

9. The method according to claim 1 wherein generating a challenge in the ECU includes generating a different challenge each time a request for the ECU identification value is made.

10. A method for allowing access to a controller, said method comprising:
   storing a controller identification value that identifies the controller in a memory on the controller;
   storing the controller identification value and a controller security key value associated with the controller identification value at a remote and secure database;
   requesting the controller identification value and a challenge from the controller by a service tool;
   generating a challenge in the controller in response to the request, wherein generating a challenge in the controller includes generating a different challenge each time a request for the controller identification value is made, and wherein generating a challenge in the controller includes computing a random or pseudorandom bit value;
   sending the controller identification value and the challenge from the controller to the service tool;
   sending the controller identification value and the challenge from the service tool to the secure database;
   identifying the controller security key value that corresponds to the controller identification value;
   generating a message in the database based on the controller security key value that includes a response to the challenge;
   sending the message from the database to the service tool;

sending the message from the service tool to the controller; and allowing access to the controller if the response to the challenge is accepted by the controller.

11. The method according to claim 10 wherein generating a message in the database includes using a secure message authentication code that is keyed to the controller security key value to provide an authenticator.

12. The method according to claim 10 wherein there is no relationship between the controller identification value and the controller security key value other than the controller identification value being used to identify the controller security key value.

13. The method according to claim 10 wherein the controller identification value and the controller security key value are related by a secret key where the controller security key value is calculated using the controller identification value and the security key.

14. The method according to claim 13 wherein the controller security key value is calculated using a secure cryptographic message authentication code.

15. A system for allowing access to a controller, said system comprising:

a computing device programmed for:

storing a controller identification value that identifies the controller in a memory on the controller;

storing the controller identification value and a controller security key value associated with the controller identification value at a remote and secure database;

requesting the controller identification value and a challenge from the controller by a service tool;

generating a challenge in the controller in response to the request;

sending the controller identification value and the challenge from the controller to the service tool;

sending the controller identification value and the challenge from the service tool to the secure database;

identifying the controller security key value that corresponds to the controller identification value;

generating a message in the database based on the controller security key value that includes an answer to the challenge;

sending the message from the database to the service tool;

sending the message from the service tool to the controller; and allowing access to the controller if the response to the challenge is accepted by the controller.

16. The system according to claim 15 wherein the means for generating a message in the database uses a secure message authentication code that is keyed to the controller security key value to provide an authenticator.

17. The system according to claim 15 wherein there is no relationship between the controller identification value and the controller security key value other than the controller identification value being used to identify the controller security key value.

18. The system according to claim 15 wherein the controller identification value and the controller security key value are related by a secret key where the controller security key value is calculated using the controller identification value and the security key.

19. The system according to claim 15 wherein the means for generating a challenge in the ECU computes a random or pseudorandom bit value.

20. The system according to claim 15 wherein the means for generating a challenge in the ECU generates a different challenge each time a request for the ECU identification value is made.

* * * * *